United States Patent

[11] 3,590,209

[72] Inventor James P. Tatham
Wheaton, Ill.
[21] Appl. No 726,440
[22] Filed May 3, 1968
[45] Patented June 29, 1971
[73] Assignee Continental Can Company, Inc.
New York, N.Y.

[54] CONTROL CIRCUITRY FOR DIRECT CURRENT
8 Claims, 12 Drawing Figs.

[52] U.S. Cl. 219/108
[51] Int. Cl. B23k 11/24
[50] Field of Search 214/108, 117; 219/131, 125; 314/63

[56] References Cited
UNITED STATES PATENTS
2,302,119 11/1942 Hagedorn 219/108 X
2,478,527 8/1949 Dawson et al. 219/108 X
3,005,901 10/1961 King 219/131 X

*Primary Examiner*—J. V. Truhe
*Assistant Examiner*—J. G. Smith
*Attorney*—Petherbridge, O'Neill and Aubel

ABSTRACT: Control circuitry is disclosed herein for controlling the flow of direct current through a load. The control circuitry includes a switching circuit for selectively switching the current flowing through the load to ON and OFF conditions at a high repetition rate.

One embodiment of the control circuitry is particularly adapted for use with, and forms an integral part of, a direct current electrical resistance welding system for welding metallic blanks which are serially passed between cooperating welding electrodes.

INVENTOR.
JAMES P. TATHAM

BY
Petherbridge, O'Neill & Aubel
ATTORNEYS

INVENTOR.
JAMES P. TATHAM
BY
Petherbridge, O'Neill & Aubel
ATTORNEYS

INVENTOR.
JAMES P. TATHAM
BY
Petherbridge, O'Neill & Aubel
ATTORNEYS

INVENTOR.
JAMES P. TATHAM
BY
Petherbridge, O'Neill & Aubel
ATTORNEYS

INVENTOR.
JAMES P. TATHAM
BY
Petherbridge, O'Neill & Aubel
ATTORNEYS

A - SWITCHING POINT-
$I_T = I_W$ BEFORE POINT A
$I_T = I_W + I_S$ AFTER POINT A
B - SWITCHING POINTS

INVENTOR.
JAMES P. TATHAM
BY
Petherbridge, O'Neill & Aubel
ATTORNEYS

CONTROL CIRCUITRY FOR DIRECT CURRENT

BACKGROUND OF THE INVENTION

1. Field of Invention

This invention relates to an improved control circuitry for controlling and switching high amperage currents.

2. Description of the Prior Art

The prior art discloses direct current switching means; however, no known prior art discloses a means for switching direct current, and more particularly high-amperage current ON and OFF to a load at a high repetition rate; that is, a number of times per second.

Referring to the welding field, known prior art discloses apparatus for direct current resistance welding. For example, U.S. Pat. No. 1,936,061 discloses an apparatus for maintaining the current from the associated direct current generator constant. Other known prior art suggests the use of a direct current for welding long lengths of seams to obtain better, uniform welded seams. Moreover, the prior art recognizes the difficult problems heretofore encountered in switching direct current ON and OFF at a high repetition rate to precisely initiate and terminate the weld at selected points on the object being welded. One of the principal difficulties heretofore present in the switching of direct current to welding electrodes is that arcing produced at the electrodes due to the switching of the current causes a myriad of other problems including electrode wear and generally poorer welding results.

Accordingly, previous attempts to provide direct current welding have met with little or no success inasmuch as it has not been possible to switch the welding current ON and OFF at high repetition rates and to accurately control the point at which the switching transient is initiated.

SUMMARY OF THE INVENTION

This invention relates generally to control circuitry for controlling the flow of a direct current flowing through a load wherein appreciable inductance may be present in the electrical circuits connected to the load.

One embodiment of the invention is particularly adapted for use in an electrical resistance welding system arranged to weld blanks which are to form the cylindrical portion of can bodies. In welding can bodies, the blanks for forming the bodies are first formed into a tubular cylinder having overlapping edge portions which are then individually passed serially or one at a time through roller welding electrodes to be welded thereby. The can body blanks move at a high rate of speed past or through the welding electrodes, hence the current employed to develop the heat to effect the welding is desirably of relatively large amperage to provide a suitable weld seam.

The size of the blanks and the speed at which the blanks pass between the welding electrodes necessitates that the starting and stopping of the current flow to the electrodes be precisely controlled; that the current provided has a fast rise time and a sharp cutoff; and, that the steady state amplitude of the current be substantially constant.

Accordingly, it is a principal object of the present invention to provide control circuitry for precisely controlling and switching ON and OFF at a high repetition rate of high-amperage direct current feeding a load.

It is another object of the present invention to provide a control circuitry for an electrical resistance seam-welding system wherein metallic blanks moving at high speeds serially pass through and are welded by welding electrodes. The invention includes a shunting means to control the current flow through the welding electrodes and the current may not necessarily turn completely OFF so long as it is reduced substantially below the welding limit at the desired point or position of the blank relative to the electrodes.

The nature of the invention will be more clearly understood by reference to the following detailed description, the appended claims, and the illustrated accompanying drawings.

DESCRIPTION OF THE PREFERRED EMBODIMENTS

CURRENT CONTROL SYSTEM

Figure 1:
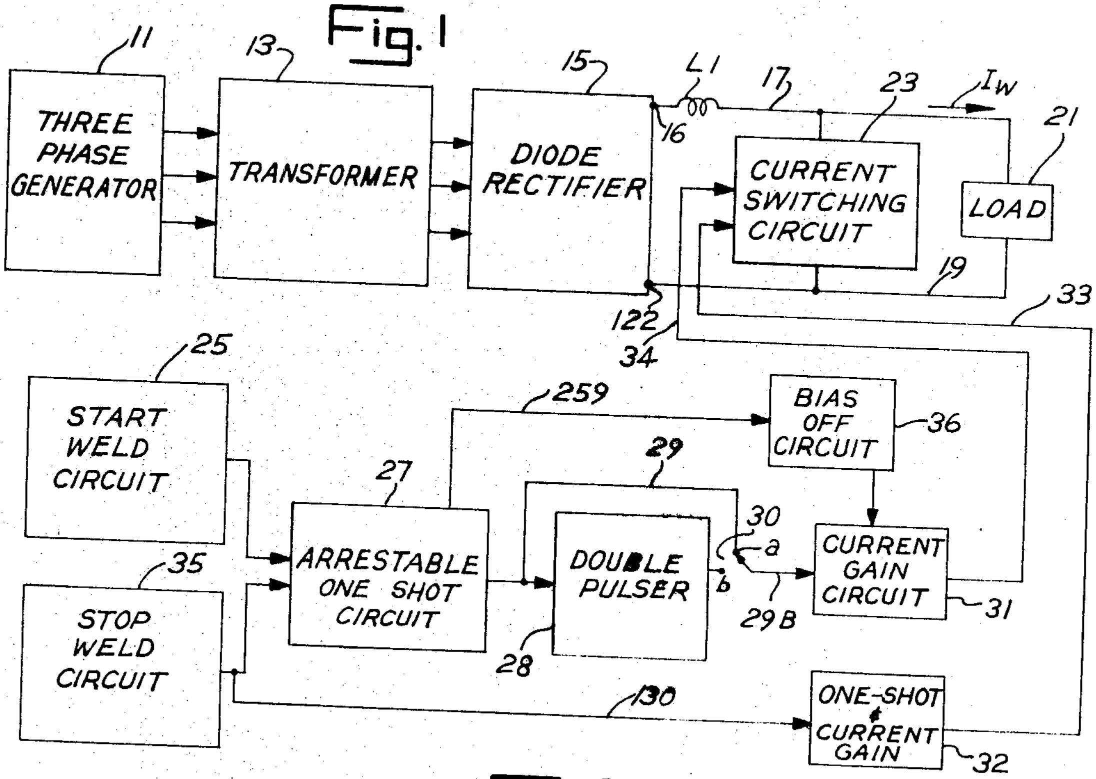
FIG. 1 shows, in block diagram form, a current control system in accordance with the invention.

Referring to FIG. 1, an electronic control circuitry 10 for controlling the flow of direct current through a load is shown in block diagram. An alternating-current generator 11 provides a three-phase current through a stepdown transformer 13 to a full-wave diode rectifier 15 which rectifies the alternating current (AC) to provide a direct current (DC) through an inductor $L_1$ and conductive leads 17 and 19 to the load, generally indicated as 21. The generator 11, transformer 13 and full-wave rectifier 15 may be of any suitable known design and hence will not be described other than in connection with the operation of the overall system of FIG. 1.

A current-switching circuitry 23, in accordance with the invention, selectively effects a shunt switch across the load. As will be explained in more detail hereinbelow, the foregoing portion of the circuit of FIG. 1 functions generally as follows.

In operation, the generator 11 provides a three-phase current to the transformer 13 and thence to the rectifier 15. A direct current $I_W$, indicated by the arrowed line, flows from terminal 16 of rectifier 15 through inductor $L_1$, lead 17 through the load and back through return lead 19 to terminal 122 of rectifier 15.

When the switching circuit 23 is activated, as will be explained, a switching or crowbar action is initiated which causes the current to be shunted through the switching circuit 23 and consequently causes the current flowing through the load to be sharply decreased. When the switching circuit 23 is deactivated, the current $I_W$ will again be permitted to flow through the load.

As mentioned hereinabove, one embodiment of the control circuitry of the invention is particularly adapted for use with a direct-current seam-welding system wherein a series of successive seam welds on metallic blanks have to be made to form can bodies.

In the can-making operation, the blanks 22 to be welded to form the can bodies are advanced along forming apparatus as is well known in the art. For present purposes only, a side edge or cross section portion of the blanks 22 is shown as a heavy line in the Figures. The body-forming apparatus (not shown) includes an elongated metallic horn and motion imparting or advance means for handling and conveying the blanks 22 along a path generally parallel to the extension of the horn. The forming apparatus bends the blanks from a flat rectangular shape into a closed cylindrical shape encircling the elongated metallic horn as the blanks move along the horn such that the side edges of the blanks meet and overlap to provide an interface of relatively small width. A pair of electrodes 21A (see FIG. 2) are rotatably mounted adjacent the horn and the blanks 22 are passed through the welding electrodes, the overlapping edge portions may be tack welded, as is well known in the art, to provide mechanical precision to the positioning of the overlapped portions.

In order to obtain a good seam weld along the entire length of the blanks 22, the current must be applied to the electrodes 21A from the beginning or leading edge of the blanks to the back or trailing edge of the blanks. However, it has been found necessary to switch the current ON and OFF at a precise point near said leading and trailing edge in order to avoid the erosion of the electrodes 21A and the can body blanks which occurs when the electrodes roll over or past said edges of the blanks with a full or maximum current being applied thereto.

After the cylinder is welded, the ends of the cylinder may then be flanged of turned outwardly to accommodate the end covers thereon.

In certain applications, it has been found that when the welds are extended from the leading edge to the trailing edge of the tubular cylinder and flanging is performed, the flange may become deformed and split or develop fissures. Accordingly, it may be necessary to start and stop and welding operation at precisely controlled points, some precise distance from said edges of the blank, in order to permit proper flanging and yet obtain proper sealing of the weld throughout its length.

In one embodiment, a direct welding current of several thousand amperes was utilized and the welding rate was approximately 600 cans per minute or 10 can blanks per second. Thus, the high-amperage direct current must be turned ON to weld and turned OFF to stop welding 10 times per second at definite, precise points or positions on each of the can blanks.

The function of the additional control circuitry shown in block form in FIG. 1 will now be briefly discussed as relates to a welding system, and next the details of the structure and operation of the various circuits will be described.

It might again be emphasized that the invention generally comprises a system for controlling the flow the direct current through a load, and is particularly useful in connection with direct-current welding apparatus as will be described.

Figures 2, 2A:
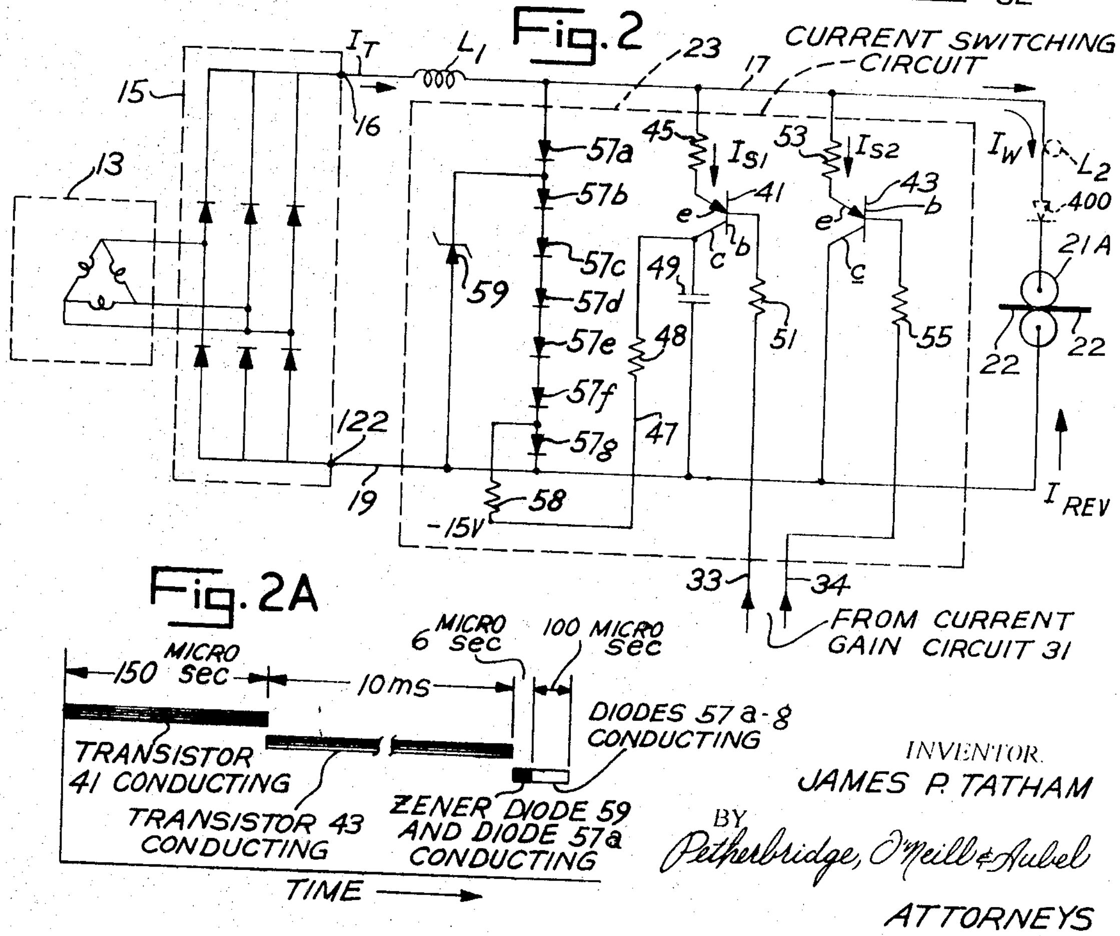
FIG. 2 is a circuit diagram of the details of the current-switching circuit 23 which is a part of the system of FIG. 1.
FIG. 2A is a bar graph useful in explaining the operation of the current-switching circuit 23.
Figures 3, 3A:
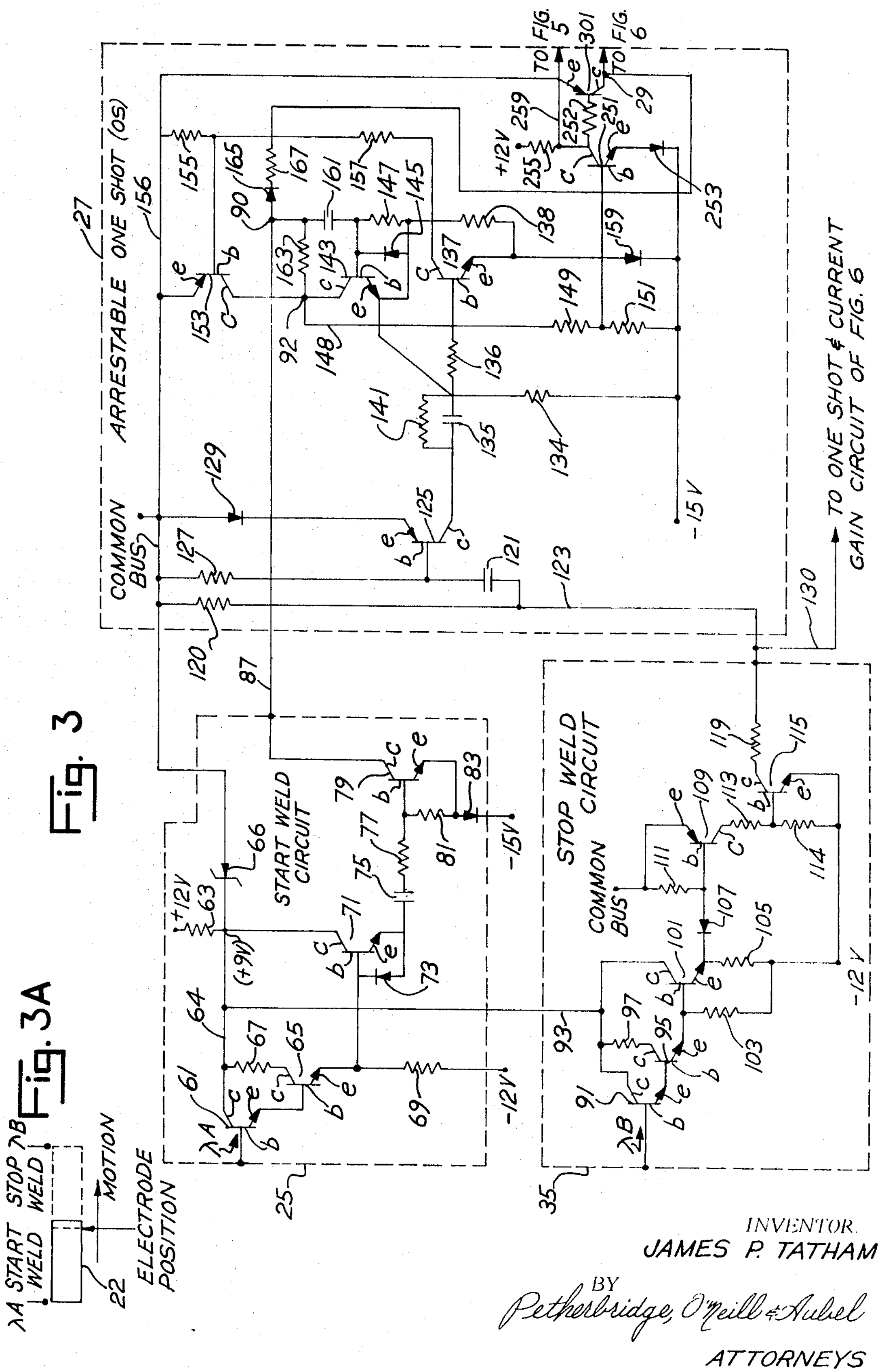
FIG. 3 is a circuit diagram of the start weld circuit 25, the stop weld circuit 35 and the arrestable one-shot (OS) circuit 27 which is a portion of the system of FIG. 1.
FIG. 3A is a sketch useful in explaining the operation of the circuitry of FIG. 3.

The start weld circuit 25 which may comprise a phototransistor or other suitable sensing device is energized by an associated source of light when a blank 22 to be welded passes the first or start welding position A (see FIG. 3A). The circuit 25 provides a signal to shift a one-shot (OS) circuit (sometimes referred to as a monostable multivibrator) 27 from an initial operating condition to a second operating condition, and provides a signal through a manual switch 30 and conductive leads 29 and 29B to a current gain or amplifier circuit 31. Current gain circuit 31 in turn provides signals through conductive lead 34 to cause current-switching circuitry 23 to be turned OFF, and hence to permit the welding current to flow through the load comprising the welding electrodes 21A and the blanks to be welded (see also FIG. 2). In FIG. 2, the electrodes 21A are shown as roller electrodes; however, other suitable types of electrodes known in the art may be employed.

When a blank 22 moves to the second or stop welding position B (see FIG. 3A), the blank interrupts the light from an associated source of light and the stop weld circuit 35, which may also comprise a phototransistor, is turned OFF causing the arrestable OS 27 to shift to its initial operating condition. A second signal is provided through lead 130 to a one-shot and current gain circuit 32 to couple a signal to turn ON the current-switching circuit 23 and shunt or bypass the welding current around the electrodes 21A, as will be explained. The welding current through welding electrodes 21A is thus sharply and precisely reduced to a level less than that required for welding the blank 22.

As will be appreciated from the drawing of FIG. 1, the double pulser circuit 28 may or may not be connected in the control system. The function of the double pulser circuit is to assure that the amplitude of the initial welding current applied to successive blanks is substantially the same, will be thoroughly explained hereinbelow.

Current-Switching Circuit

During the welding operation, direct current will flow through the electrodes 21A to weld the blanks 22. As discussed above, it is necessary to start and stop the welding operation at precise discrete points or positions on each blank; and, in order to do so the amplitude of current flowing through the electrodes 21A must be caused to rise sharply to a level to initiate the welding operation, that is, to turn ON and then must be caused to drop sharply below the weld level to stop the welding operation, that is, to turn OFF.

The current-switching circuit 23 functions to control and switch the current flowing through the welding electrodes 21A ON and OFF sharply and precisely. As will be explained fully hereinbelow, circuit 23 may be considered as comprising three subcircuits. More explicitly, the current-switching circuit 23 includes polarity reversely means for developing a polarity reversal or forcing voltage which tends to develop a reverse current flow through the electrodes 21A which thus opposes the flow of welding current through the electrodes and thereby causes a sharp decrease in the welding current. The current-switching circuit 23 also includes a shunting means cooperating with the polarity reversal means to provide a shunt path for the welding current. The current-switching circuit further includes voltage and current-protective devices which protect the other elements of the current-switching circuit from high-voltage transients and the high-current surges which may be developed due to the inductance connected in, or inherent in, the system.

FIG. 2 shows the circuit diagram of the current-switching circuit 23 of FIG. 1 connected as a portion of the system of FIG. 1. The circuit connections will first be described, then the details of the operation of the circuit will be described.

Current-switching circuit 23 comprises two PNP type transistors 41 and 43 each having an emitter *e*, a base *b*, and a collector *c* electrode. Note that the transistors used in the various circuits disclosed herein are of conventional type and include PNP and NPN transistors with each type having a base, an emitter, and a collector electrodes. The designations *b*, *e*, and *c* used hereinafter, respectively, refer to the base, emitter, and collector electrodes of these types of transistors.

The emitter *e* of transistor 41 is connected through resistor 45 to lead 17 and its collector *c* is connected through resistor 48 and lead 47 to a −15-volt source. Collector *c* of transistor 41 is also connected through a capacitor 49 to lead 19, and its base *b* is connected through a series resistor 51 and conductive lead 33 to the one-shot and current gain circuit 32. The emitter *e* of transistor 43 is connected through a resistor 53 to lead 17, its collector *c* is connected to lead 19, and its base *b* is connected through series resistor 55 and conductive lead 34 to a current gain circuit 31 (see FIG. 1).

Transistors 41 and 43 are biased to be in a normally OFF or nonconducting condition.

A group of series connected diodes, generally labeled 57, are connected across leads 17 and 19 with the diodes being connected or poled to permit current to flow from leads 17 and 19. In the embodiment shown seven diodes, 57*a*—57*g*, are connected across leads 17 and 19; however, more or less diodes can be employed. A Zener diode 59 is connected to have its anode connected to the lead 19, and hence provides a protective function for transistors 41 and 43. The junction of diodes 57*f* and 57*g* is connected through a resistor 58 to the −15-volt source to permit diodes 57*a* through 57*f* to be forward biased to enable a low-trickle current to flow therethrough and enable the diodes to be initially ON, for purposes to be explained. Note that diode 57*g* remains biased OFF.

An inductive element indicated as a series inductor $L_1$ is series connected to lead $L_T$. Inductor $L_1$ functions to smooth out the direct current from rectifier 15. Inductor $L_1$ also tends to assure that a constant current supply is maintained in spite of any fast transients in the system such as due to varying resistance at the weld. Further, inductor $L_1$ prevents an excessive rate of rise of the current during the time the shunt switch is turned ON or is conducting. It follows also that the inductor $L_1$ assures that a high initial current is present to start each welding operation after the switching circuit 23 is turned OFF.

Before proceeding further, it should be appreciated that current being utilized as a welding current is in the order of thousands of amperes. Accordingly, while transistor 41, resistors 45 and 48 and capacitor 49 are each indicated as being a single circuit, in one commercial embodiment a total of 80 such circuits, essentially identical in structure and operation to that shown and connected in parallel therewith, were utilized in the system to handle the high currents involved. As is known, the additional paths in parallel reduces the current flow through each path. Similarly, with transistor 43 and resistor 53 a total of 160 such paths connected in parallel were required in one commercial embodiment.

Operation of Current-Switching Circuit

In operation, assume the AC generator is providing a current through transformer 13 and rectifier 15, and indicated as current $I_T$, to the welding electrodes 21A. As mentioned, transistors 41 and 43 are biased to be normally OFF. The voltage across leads 17 and 19 is sufficiently low (approximately 1.5 volts) such that the diodes 57 are not conducting, except for the trickle current which flows through diodes 57*a*—57*f*. Assume the current $I_T$ is flowing through lead 17 in the direction indicated by the arrow, and that a welding current $I_W$ is flowing through welding electrodes 21A and a welding operation is being performed. Note that at this point the total current $I_T$ is flowing through the welding electrodes 21A and hence $I_T = I_W$.

Assume next that a stop weld signal is received on base *b* of each of transistors 41 and 43 from the current gain circuit 31 and 32 via leads 33 and 34. The signal on the base *b* of each of transistors 41 and 43 is a negative going signal which causes transistor 41 to turn ON or conduct currents $I_{S1}$.

The upper plate (as oriented in FIG. 2) of capacitor 49 is initially at a −15-volt potential, and the lower plate of capacitor 49 is at 0v potential. When transistor 41 conducts the upper plate of capacitor 49 will go positive to about the potential of lead 17 and since capacitor 49 cannot change its charge instantaneously, the potential at its lower plate will rise a corresponding amount. This instantaneous high positive potential on the lower plate of capacitor 49 acts as a forcing voltage which tends to drive a current $I_{Rev}$ through the current electrodes in a direction opposite to the flow of the welding current $I_W$. This opposing current $I_{Rev}$ through electrodes 21A thereby reduces the current $I_W$. Note that $I_W > I_{Rev}$.

The capacitor 49 charges relatively quickly and then blocks direct current flow through transistor 41. Thus, the instantaneous reverse current $I_{Rev}$ will oppose the flow of current $I_W$ and sharply reduce the current flowing through the welding electrodes 21A.

Note that when transistor 41 conducts and couples a high positive signal to lead 19, transistor 43 will be reverse biased and will not conduct. However, capacitor 49 discharges relatively fast, and hence will permit the collector *c* of transistor 43 to return to a potential to permit transistor 43 to conduct. Transistor 43 will now conduct a current $I_{S2}$ thus bypassing or shunting the current around the welding electrodes 21A. Accordingly, transistor 41 and capacitor 49 effect a forcing voltage or polarity reversal which initiates a reverse current $I_{Rev}$ to reduce and effectively quickly turn OFF the welding current $I_W$; and, transistor 43 provides a shunt path for the current from the rectifier 15.

Assume now that a start welding signal is received resulting in removal of base drive *b* of the transistor 43. (Note that base drive *b* at transistor 41 had only been applied for about 150 microseconds and therefore is already OFF at this time.) When the current $I_{S2}$ flowing through leads 17 and 19 in the direction indicated is interrupted, the inductor $L_1$ in FIG. 2 will tend to continue to drive the current in the direction it was flowing. The inductive effect or "kick" of inductor $L_1$ which is relatively large will thus cause a high transient voltage and a surge of current through inductor $L_2$. The Zener diode 59 will however break down at a preset voltage level and diode 57*a* is already in conduction, hence the transistors 41 and 43 will be protected for the high transient voltages initially by the Zener diode and then the diode string 57 after the turn-on time of diode 57*g*.

Refer now to FIG. 2A wherein the timing or time operation of the transistors 41, 43, Zener diode 59 and diodes 57*a*—57*g* is indicated. Assuming that starting at time $t=0$ in FIG. 2A, transistor 41 will conduct for approximately 150 microseconds. After 150 microseconds, capacitor 49 will begin to return toward its initial condition and transistor 43 will start to conduct for about 10 milliseconds. Upon turnoff of transistor 43, the inductance $L_1$ will effect a surge of voltage; however, Zener diode 59 will break down and conduct for about 6 microseconds, thereby protecting transistors 41 and 43, and also allowing time for diode 57*g* to become forward biased and conduct. (Note that diodes 57*a* through 57*f* are already ON.) Zener diode 59 and diodes 57 bypass current as required to limit voltage surges to values which will not damage transistors 41 and 43.

As mentioned above, diodes 57*a*—57*f* have a trickle current flowing therethrough, and hence only diode 57*g* has to become forward biased and conduct thereby reducing the time required to cause the diode string 57 to conduct and bypass and current surge.

A further explanation of the relationship of the current $I_W$ flow through the welding electrodes 21A and the current flow $I_{S1}$ and $I_{S2}$ flow through the switching circuit 23, and particularly as to the need and means for effecting a precise initiation and termination of the welding current will be made hereinbelow in connection with the operation of the arrestable one-shot circuit 27, the double pulser circuit 28, bias off circuit 36, current gain circuit 31, and the one-shot and current gain circuit 32.

Start Weld Circuit; Stop Weld Circuit; Arrestable One-Shot Circuit

The start weld circuit 25 functions to optically, or otherwise, sense that a blank is in position to be welded by the welding electrodes 21A, and, accordingly, the start weld circuit initiates the operation which causes the current-switching circuit 23 to be deenergized or deactuated to permit the welding current to flow through the welding electrodes.

The stop weld circuit 35 functions to optically, or otherwise, sense that a blank is in a position at which its weld should be stopped or terminated; and, accordingly, the stop weld circuit initiates the operation which causes the current-switching circuit 23 to be energized or actuated to decrease the welding current flow through the welding electrodes and provide a shunt path for the welding current.

The arrestable one-shot (OS) 27 functions principally to assure that the signal from the stop weld circuit 35, to energize the current-switching circuit 23 and thus terminate the welding operation, is effective for not more than a preset period of time. OS 27 can be returned to its initial state prior to the termination of the preset period of time by the start weld circuit 25 to thereby deenergize the current-switching circuit 23 and initiate a succeeding welding operation.

The circuit diagrams of the start weld circuit 25, the stop weld circuit 35, and the arrestable OS 27 are shown in FIG. 3. The circuit connections will first be detailed, then the operation of the circuits will be described.

Referring to FIG. 3, the start weld circuit 25 comprises a conventional type phototransistor 61 of the NPN type. The collector *c* transistor 61 is connected through a conductive lead 64 and through a Zener diode 66 to the common bus. The junction of the cathode of Zener diode 66 and lead 64 is connected through a resistor 63 to a +12-volt source. Zener diode 66 is designed and connected to provide an effective +9-volt potential to lead 64 and the elements connected thereto. The emitter *e* of transistor 61 is connected to base *b* of an NPN transistor 65. The collector *c* of transistor 65 is connected through resistor 67 to lead 64, and its emitter *e* is connected through a resistor 69 to a −12-volt source.

The transistor 61 is energized to conduct when a light beam from a selected source λA shines on its base *b*. As will be appreciated, the source λA and the base *b* of phototransistor 61 may be positioned along a first datum line to straddle the path of the blanks 22, and arranged with respect to the welding electrodes 21A such that the associated circuitry is caused to be activated to cause a welding current to flow through the electrodes 21A when a blank moves past the datum line permitting source λA to energize phototransistor 61 to indicate that the blank is in the position at which the welding operation is to start (see FIG. 3A).

Transistor 65 amplifies the signal from transistor 61. The signal from transistor 65 is coupled from its emitter *e* to the base *b* of PNP transistor 71. A diode 73 has its cathode connected to the base *b* and its anode connected to the emitter *e* of transistor 71 to provide a rest path for capacitor 75. The emitter *e* of transistor 71 provides a signal pulse through a series connected capacitor 75 and resistor 77 to base *b* of an NPN transistor 79. The base *b* of transistor 79 is connected through a biasing resistor 81 and a diode 83 to a source of −15-volt potential, and its emitter *e* is connected to the junction of resistor 81 and diode 83. The collector *c* of transistor 79 is connected through a conductive lead 87 to provide a signal to terminal point 90 of the arrestable OS circuit 27, for purposes to be explained.

Operation of Start Weld Circuit

In operation, the transistors 61, 65, 71 and 79 of the start weld circuit 25 are biased to be in an OFF or nonconducting condition. When light rays from a source λA energize its base *b*, transistor 61 is caused to conduct thereby providing a positive going input signal to the base *b* of transistor 65 which conducts and amplifies the signal. Emitter *e* then becomes relatively positive and its signal is coupled to the base *b* of transistor 71 causing transistor 71 to conduct and its emitter *e* to go positive.

The positive signal at the emitter *e* of transistor 71 is coupled as a signal pulse through capacitor 75 and resistor 77 to the base *b* of transistor 79 causing transistor 79 conduct for a short length of time. When transistor 79 conducts, its collector *C* provides a negative signal through lead 87 to terminal point 90 of the arrestable OS 27 to, in effect, turn OFF the shunt of bypass circuit and start the welding operation, as will be explained in connection with the operation of OS circuit 27.

Stop Weld Circuit

The stop weld circuit 35 comprises an NPN phototransistor 91, similar in structure and operation to phototransistor 61, having its base *b* connected to be energized by light beams from a source indicated as λB. The source λB and the phototransistor 91 are positioned in spaced relation to source λA and transistor 61, and are further positioned along a second datum line to straddle the path of the blanks (see FIG. 3A). Source λB and phototransistor 91 are arranged with respect to the welding electrodes 21A such that when the light beams from the source λB to the phototransistor 91 are interrupted, as by a blank, the associated circuitry is caused to be activated to cause the welding current flowing the through the electrodes 21A to be turned OFF or significantly reduced to thereby stop the welding operation (see FIG. 3A).

The collector *c* of transistor 91 is connected through lead 93 to lead 64 and resistor 63 to the +9-volt potential, and its emitter *e* is connected to the base *b* of an NPN transistor 95. The collector *c* of transistor 95 is connected through a resistor 97, lead 93 and resistor 63 to the +9-volt potential, and its emitter *e* is connected to the base *b* of an NPN transistor 101. The base *b* of transistor 101 is connected through a biasing resistor 103 to the −12-volt source, its collector *c* is connected through lead 93 and resistor 63 to the +9-volt potential, and its emitter *e* is connected through through resistor 105 to the −12-volt source.

The signals from transistor 101 are coupled from its emitter *e* through diode 107 to the base *b* of a PNP transistor 109. Diode 107 is connected to have its anode connected to the base *b* of transistor 109; that is, diode 107 is connected to couple a negative going signal therethrough. The base *b* of transistor 109 is connected through resistor 111 to the common bus, its emitter *e* is connected directly to the common bus, and its collector *c* is connected through series resistors 113 and 114 to the −12-volt source.

The signal from the collector *c* of transistor 109 is coupled to the base *b* of a PNP transistor 115 from the junction of resistors 113 and 114. The emitter *e* of transistor 115 is connected to the −12-volt source, and its collector *c* is connected through series resistors 119 and 120 (resistor 120 is shown in FIG. 3 to be in the OS 27) to the common bus. The signal from the transistor 115 is coupled from the junction of resistors 119 and 120 through conductive lead 123 to a capacitor 121 in the arrestable OS 27. OS 27 then activates the switching circuit 23 and bypasses the welding current for stopping the welding operation, as will be explained. Also, a signal is coupled from the stop weld circuit 35 through lead 130 to the one-shot and current gain circuit 32, for purposes to be explained.

Transistors 91, 95, 101 of the stop weld circuit are biased to be normally nonconducting when no signal is coupled to the base *b* of phototransistor 91, and are caused to conduct when base *b* of phototransistor 91 is energized. Transistors 109 and 115 are biased oppositely and are caused to be nonconducting when phototransistor 91 is energized.

Operation of Stop Weld Circuit

In operation, assume the light source λB is energizing base *b* of transistor 91. Transistor 91 is thus conductive and provides a positive signal to the base *b* of transistor 95 causing transistor 95 to conduct and provide a positive signal to the base *b* of transistor 101 and causing transistor 101 to conduct and develop a positive signal at its emitter *e*; however, diode 107 blocks the positive signal.

When the rays from light source λB to base *b* of transistor 91 are interrupted as by the metallic blank to be welded (see FIG. 3A), transistor 91 is turned OFF. When transistor 91 turns OFF, transistors 95 and 101 will also be turned off. When this occurs, emitter *e* of transistor 101 drops to relatively negative potential thereby providing a negative signal through diode 107 to base *b* of transistor 109, causing transistor 109 to conduct and its collector *c* to provide a relatively positive signal through resistor 113 to base *b* of NPN transistor 115 to cause transistor 115 to conduct. The collector *c* of transistor 115 thereby becomes relatively more negative and a negative signal pulse is coupled through resistor 119, capacitor 121 and lead 123 to the arrestable OS 27 to cause OS 27 to provide a signal to stop the welding operation, as will be explained.

Arrestable One-Shot Circuit

As mentioned, the arrestable one-shot circuit (OS) 27 comprises a one-shot circuit (sometimes referred to in the art as a monostable multivibrator) which can be arrested or signaled to return to a desired initial position before the termination of a selected time period.

Referring to FIG. 3, the OS 27 includes a capacitor 121 connected to the base *b* of a PNP type transistor 125. Base *b* of transistor 125 is also connected through a biasing resistor 127 to the common bus, its emitter *e* is connected through a diode 129 to the common bus. The signal from transistor 125 is coupled from its collector *c* through a parallel RC circuit comprising a resistor 141 and capacitor 135, and through a series resistor 136 to the base *b* of an NPN transistor 137. The emitter *e* of transistor 137 is connected through a diode 159 to the −15-volt source, and its collector *c* is connected through series resistors 157, 155 and lead 156 to the common bus.

The junction of capacitor 135 and resistor 136 is connected to the emitter *e* of a NPN transistor 143. A diode 145 is connected across the emitter *e* to the base *b* of transistor 143, and a resistor 147 is connected in parallel with diode 145. Diode 145 functions to provide a low-impedance discharge path for resetting capacitor 161 to prepare for the next cycle of operation. The lower terminal of resistor 147 is connected through resistor 138 and diode 159 to the −15-volt source.

The collector *c* of transistor 143 is connected through lead 148 and resistors 149, 151 to the −15-volt source; and, is also connected to the collector *c* of a PNP transistor 153. The emitter *e* transistor 153 is connected to the common bus and its base *b* is connected to the junction of resistors 155 and 157.

A capacitor 161 and a series resistor 163 are connected across the collector *c* to base *b* of transistor 143. The junction of capacitor 161 and resistor 163 is connected to a terminal point 90 indicated on lead 87 which is connected to the start weld circuit 25. Terminal point 90 also connects through a diode 165 and series resistor 167 to the collector of transistor 301. Diode 165 is connected or poled to pass a positive signal therethrough. The foregoing circuit is feedback circuit for resetting capacitor 161 for the next cycle.

An NPN transistor 251 has its base *b* connected to the junction of resistor 149 and 151. The emitter *e* of transistor 251 is connected through a diode 253 to a −15-volt source, and its collector *c* is connected through resistor 255 to the +12-volt source. Diode 253 is connected or poled to permits a current to flow from the +12-volt source to the −15-volt source through the collector *c* to emitter *e* path of transistor 251. The collector *c* of transistor 251 thus has a +12-volt to a −15-volt swing from its OFF to its ON condition.

Figure 5:
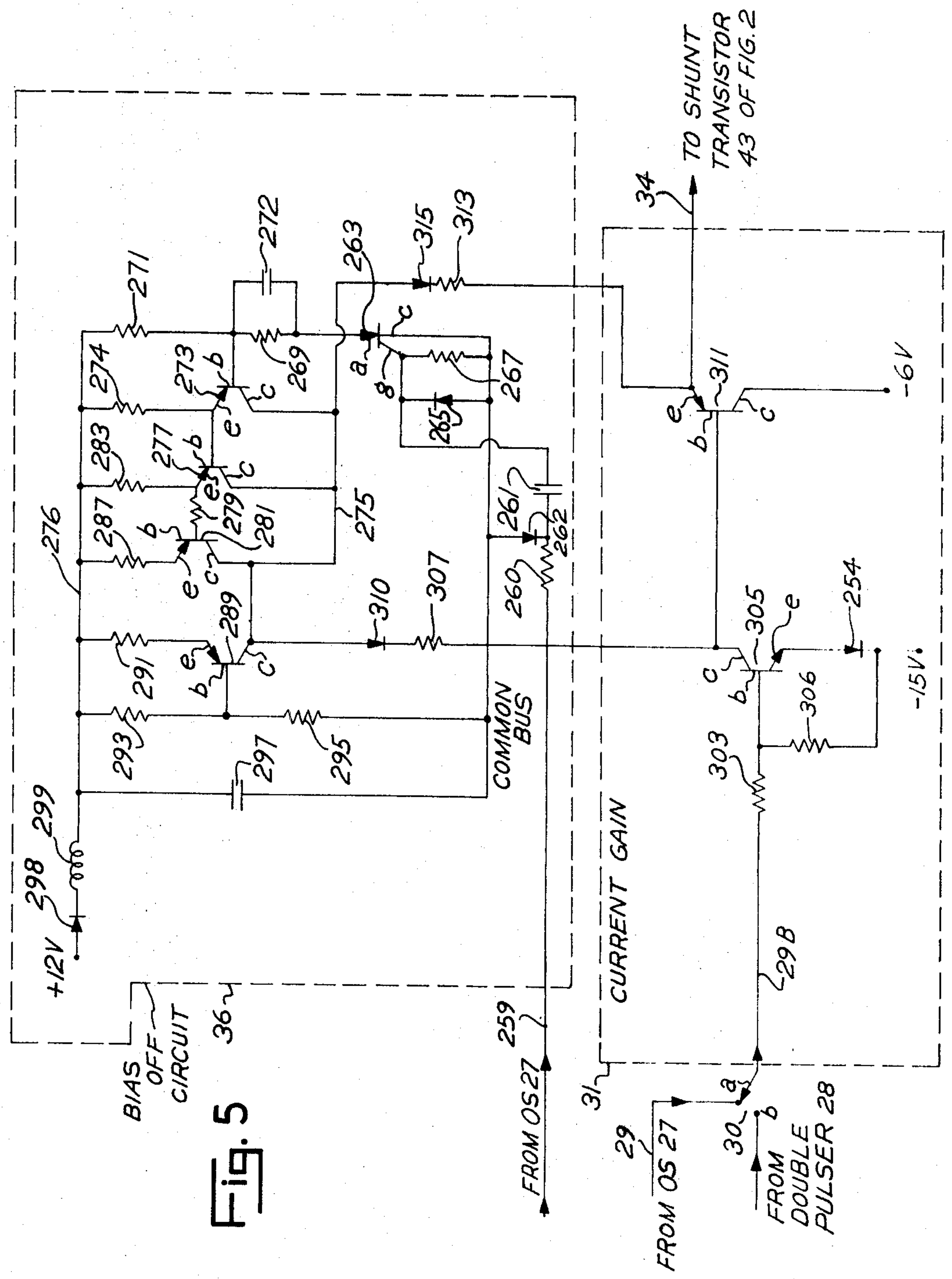
FIG. 5 is a circuit diagram of the bias off circuit 36 and the current gain circuit 31.

A first signal output from the collector *c* of transistor 251 is coupled through lead 259 to the bias off circuit of FIG. 5. A second output from the collector *c* of transistor 251 is coupled through a resistor 252 to the base *b* of a PNP transistor 301. Emitter *e* of transistor 301 is connected to the common bus and its collector *c* is connected through lead 29 to the circuits of FIG. 6 and also to the capacitor reset circuit previously mentioned, as will be explained.

Operation of Arrestable OS

Assume that the blank 22 being welded now moves to the positioned indicated by the dotted lines in FIG. 3A and interrupts the light source λB. At this point or positioned of the blank, the welding current flowing through the welding electrodes 21A has to be bypassed or shunted to stop the welding operation. This latter function is initiated by the stop weld circuit 35, as will now be explained.

When the light source λB is interrupted by the blank 22, transistor 91 will turn OFF causing transistors 95 and 101 to turn OFF and transistors 109 and 115 to turn ON and provide a negative signal from the stop weld circuit 35 through capacitor 121 to the transistor 125 in the OS 27. The negative pulse coupled through capacitor 121 causes transistor 125 to conduct and its collector *c* to provide a relatively positive signal to the base *b* of transistor 137 to cause transistor 137 to conduct. When transistor 137 conducts, a current path will be established from the common bus through lead 156, resistors 155 and 157, the collector *c* to the emitter *e* of transistor 137, and diode 159 to the −15-volt source. The potential developed across resistor 155 will forward bias transistor 153 causing it to conduct. When transistor 153 conducts, its collector *c* couples a positive potential through resistor 163 and capacitor 161 to forward bias the base *b* of transistor 143, thereby causing transistor 143 to conduct. A current path is thus established to permit transistors 153 and 143 to conduct, which path may be traced from the common bus through the emitter *e* of collector *c* of transistor 153, the collector *c* to emitter *e* of transistor 143, resistor 138 and diode 159 to the −15-volt source.

Also, a current signal path is established from the common bus through the emitter *e* of collector *c* of transistor 153, lead 148 and resistors 149 and 151 to the −15-volt source. Accordingly, a relatively positive (less negative) potential is developed at the junction of resistors 149 and 151 which is coupled to the base *b* of transistor 251 causing it to conduct. When transistor 251 conducts a negative output signal is coupled from its collector *c* through lead 259 to the bias off circuit of FIG. 5. The negative signal from collector *c* of transistor 251 is also coupled to the base *b* of transistor 301 causing it to conduct and provide a relatively positive signal to the circuitry of FIG. 6.

Transistor 143 will conduct for a period dependent on the RC time constant of capacitor 161 and resistor 163, which time constant is selected in one embodiment to provide approximately 2.5-second time period. At the end of the selected time period, transistor 143 will be biased to return to its OFF condition. During the time period that transistor 143 is ON signals will be provided through leads 29 and 259 to bias off circuit 36 of FIG. 5; and, to the gain circuit 31 of FIG. 5 or to the double pulser circuit of FIG. 6, as will be explained.

The bias off circuit 36 and the current gain circuit 31 will thus be ON, and will cause the switching circuit 23 to be energized thus bypassing the welding current and stopping the welding operation. Assume next that a succeeding blank to be welded passes portion or point A and the phototransistor 61 is energized by the light rays from the source λA. Transistors 61, 65, 71 and 79 in the start weld circuit 25 will now be biased to conduct. Accordingly, terminal point 90 and the base lead of transistor 143 will become more negative prior to the termination of the 2.5-second time period. Transistors 143, 137 and 153 will thus be turned OFF and the signal of lead 259 and 29 will be cut OFF. This in turn causes the bias off circuit 36 and the current gain circuit 31; and, hence current-switching circuit 23 to be turned OFF permitting the welding current to flow through welding electrodes 21A to initiate the succeeding welding operation. This action also initiates the discharge of capacitor 161 through diode 165, resistor 167, lead 29, terminal *a* of switch 30 (FIG. 5) and resistors 303 and 306.

If the time period between succeeding blanks is more than 2.5 seconds, transistor 143 will be biased to stop conducting and capacitor 161 will discharge, through the same path as previously traced, at the 2.5-second interval.

One-Shot and Current Gain Circuit 32

Figure 4:
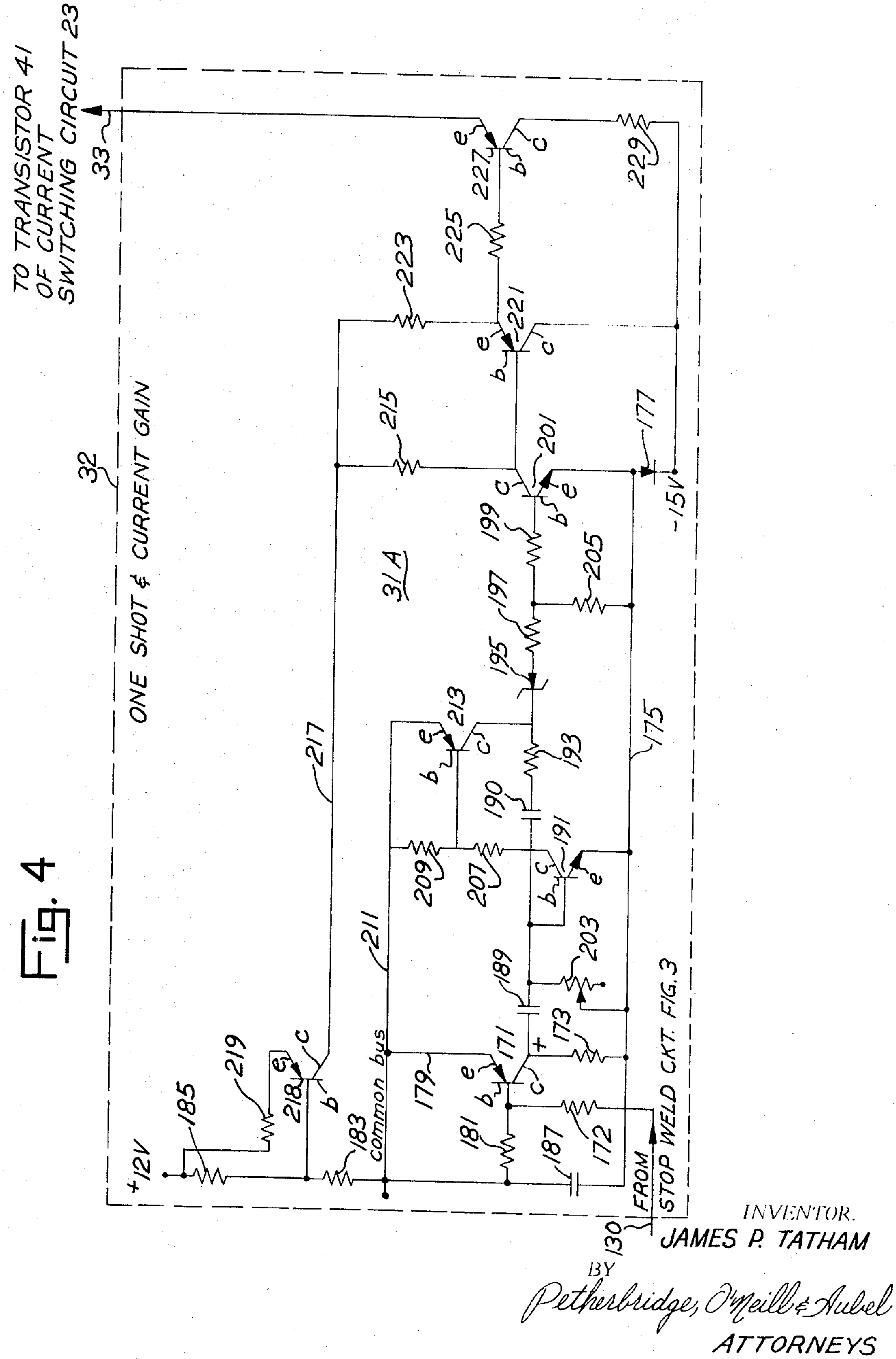
FIG. 4 is a circuit diagram of the one-shot and current gain circuit 32 of the system of FIG. 1.

The one-shot and current gain circuit 32 shown in block form in FIG. 1 and in detail in FIG. 4 functions to provide a pulse signal to cause the polarity reversal transistor 41 to turn ON and OFF.

The circuit connections will first be detailed, then its operation will be described. The signal input to the circuit 32 is coupled from the stop weld circuit 35 through lead 130 to the base *b* of a PNP transistor 171. Base *b* of transistor 171 is connected through resistors 181 to the common bus 211. The common bus is connected to the upper plate (as oriented in FIG. 5) of capacitor 187, and the lower plate of capacitor 187 is connected through lead 175 to the anode of diode 177 whose cathode is connected to the −15-volt source. The emitter *e* of transistor 171 is connected to the common bus and its collector *c* is connected through resistor 173, lead 175, and diode 177 to the −15-volt source.

A signal pulse is coupled from collector *c* of transistor 171 though capacitor 189 to the base *b* of a NPN transistor 191. Capacitor 189 its right-hand terminal (as oriented in FIG. 4) connected through a rheostat or potentiometer 203 to lead 175 to provide an adjustable RC time element. Capacitor 189 is also connected through capacitor 190 and a series circuit of resistor 193, Zener diode 195, and resistors 197 and 199 to the base *b* of a NPN transistor 201. The Zener diode 195 is connected or poled to have the incoming signal coupled to its cathode. A resistor 205 is connected from the junction of resistors 197 and 199 to lead 175.

A signal pulse is further coupled from capacitor 189 to the base *b* of a NPN transistor 191. The emitter *e* of transistor 191 is connected to lead 175 and its collector *c* is connected through resistors 207 and 209 is connected to the common bus. The junction of resistors 207 and 209 is connected to the base *b* of a PNP transistor 213. The emitter *e* of transistor 213 is connected to the common bus, and its collector *c* is connected to the junction of resistor 193 and Zener diode 195.

The emitter *e* of the transistor 201 is connected to lead 175, and its collector *c* is connected through a resistor 215 to the common bus. Transistor 218 has its base *b* connected through resistor 185 to the +12-volt source, source, and its emitter *e* connected through resistor 219 to the +12-volt source. Transistor 218 provides a biasing current control for transistors 201 and 221.

The signal from transistor 201 is coupled from its collector *c* to the base *b* of PNP transistor 221. The collector *c* of transistor 221 is connected to the −15-volt source, and its emitter *e* is connected through resistor 223 to lead 217. The output signal from transistor 221 is coupled from its emitter *e* through resistor 225 to the base *b* of a PNp transistor 227. The collector *c* of transistor 227 is connected through resistor 229 to the −15-volt source and its emitter *e* is connected through conductive lead 33 to the current switching circuit 23 (see FIG. 1).

As mentioned before, the current-switching circuit 23 is energized or rendered operative to provide a shunt path for the current flowing through the welding electrodes 21A. Thus, when the welding operation is being performed, the current-switching circuit is turned OFF, and when it is desired to terminate the welding operation the current-switching circuit 23 is energized to turn ON to provide a shunt or bypass for the current flowing through the welding electrodes. Accordingly, the one-shot and current gain circuit 32 is rendered operative to turn ON switching circuit 23 when it is desired to stop the welding function.

Operation of One-Shot and Current Gain Circuit 32

The operation of the circuit 32 will now be explained. A negative signal received from the stop weld circuit 35 through lead 130 to the base *b* of transistor 171 renders transistor 171 conductive. The collector *c* of transistor 171 goes positive and couples a positive pulse through capacitor 189 to the base of transistor 191 to cause transistor 191 to conduct. A voltage is thus developed across resistor 209 which causes transistor 213 to conduct. The signal thus created at the collector of transistor 213 first is fed back through resistor 193 and capacitor 190 to the base of transistor 191 to keep to keep the circuit ON for a period determined by the resistor 193 and capacitor 190 time constant and the attenuation of rheostat 203. Secondly, the collector voltage of transistor 213 appears as a positive signal at the cathode of Zener diode !95. When the signal level at its cathodes goes above the break down voltage, the Zener diode 195 conducts and couples a signal through resistors 197 and 199 in order to cause transistor 201 to become conductive. When transistor 210 conducts its collector *c* couples a negative signal to the base *b* of transistor 221 to render transistor 221 conductive which in turn couples a negative signal from its emitter *e* to cause transistor 227 to conduct. When transistor 227 conducts its emitter *e* goes relatively more negative and this signal is coupled through lead 33 to forward bias the base *b* of polarity reversal transistor 41, causing the transistor 41 to be turned ON and the switching action of current-switching circuit 23 to be initiated, as explained above. Note that circuit 32 is effective to provide a biasing ON signal or pulse of selected length to the transistor 41. In one embodiment the length of this pulse is determined such that transistor 41 is caused to conduct for approximately 150 microseconds, see FIG. 2A.

Bias Off Circuit 36 and Current Gain Circuit 31

The bias off circuit 36 and the current gain circuit 31 shown in block form in FIG. 1 are shown in detail in FIG. 5. The bias off circuit 36 and the current gain circuit 31 function to provide a signal to turn ON the shunting resistor 43, and also provides a source of reverse biasing current to turn OFF transistor 43 sharply in response to a signal from the start weld circuit 25 and the OS 27 for initiating a welding operation, as will be explained. Refer now to FIG. 5. The signal output from transistor 251 in the OS circuit 27 is coupled through lead 259, resistor 260 and capacitor 261 to the gate electrode *g* of a silicon controlled rectifier (SCR) 263 of conventional type. A diode 262 has its anode connected to the common bus and its cathode connected to the junction of resistor 260 and capacitor 261. The gate *g* of SCR 263 is connected to the common bus or 0-volt source through parallel connected diode 265 and resistor 267, and diode 265 is connected to prevent a voltage of a negative polarity from developing at the gate *g*. The anode *a* of SCR 263 is connected through a series resistor 269 and 271 to the positive terminal of the +12-volt source. A capacitor 272 is connected in parallel with resistor 269.

The junction of capacitor 272 and resistor 269 is connected to the base *b* of a PNP transistor 273. Transistor 273 has its emitter *e* to collector *c* circuit connected in parallel to the emitter *e* to collector *c* circuits of associated transistors 277, 281 and 289. More specifically, the emitters *e* of each of transistors 273, 277, 281 and 289 are connected through respective resistors 274, 283, 287 and 291 through a lead 276 to the +12-volt source; and, the collectors *c* of these transistors are connected in common to an output lead 275.

The emitter *e* of transistor 273 is connected to the base *b* of transistor 277 whose emitter *e* is, in turn, connected through a resistor 279 to the base *b* of transistor 281. The base *b* of transistor 289 is connected to the junction of resistors 293 and 295 which are connected in parallel with a capacitor 297. Capacitor 297 has its upper plate (oriented in FIG. 5) connected through an inductor 299 and a diode 298 to the +12-volt source, and has its lower plate connected to the common bus.

The signal from collector *c* of transistor 301 of OS 27 is coupled through lead 29, terminal *a* of switch 30, lead 29B and resistor 303 to the base *b* of a PNP transistor 305 in the current gain circuit 31. Base *b* of transistor 305 is connected through resistor 306 to the −15-volt potential. Emitter *e* of transistor 305 is connected through diode 254 to the −15-volt source, and its collector *c* is connected through a resistor 307 and a diode 310 to the collector *c* of transistor 289. The signal from transistor 305 is coupled from its collector *c* to the base *b* of a PNP transistor 311. Collector *c* of transistor 311 is connected to a −6-volt source, and its emitter *e* is connected through a resistor 313 and a diode 315 to lead 275, and the collectors *c* of each of transistors 273, 277, 281 and 289. The output signal from transistor 311 is coupled from its collector *c* through lead 34 to shunt transistor 43 of the switching circuit 23 of FIG. 2.

Operation of Bias Off Circuit and Current Gain Circuit

The operation of the circuitry of FIG. 5 will now be explained. Refer initially to the signal path traced above through transistors 305 and 311, assume these transistors are initially nonconducting and hence that the shunt transistor 43 of FIG. 2 is biased to be nonconducting. When a positive signal is applied to base *b* of transistor 251 of the OS 27 circuit, transistor 251 conducts and its collector *c* swings from a +12-volt to a −15-volt potential; transistor 301 is turned ON and couples a signal from its collector *c* to cause transistor 305 in the current gain circuit 31 to turn ON. A negative signal is then coupled from collector *c* of transistor 305 to cause transistor 311 to turn ON and provide a negative signal to the base *b* of shunt transistor 43 to bias transistor 43 ON. As discussed above, transistor 43 will not actually turn ON until capacitor 49 has discharged through transistor 41.

Concurrently, as the signal is applied to lead 29, a negative signal is also coupled from collector *c* of transistor 251 through lead 259, resistor 260 and capacitor 261 to the gate *g* of SCR 263. Since SCR 263 is OFF, the negative signal coupled to its gate *g* has no effect of its operation. When the OS 27 circuit is turned OFF by a signal from the start weld circuit 25, or after the expiration of the operating time period of OS 27, the positive signal being applied to the base *b* of transistor 251 is interrupted. Accordingly, transistor 251 will turn OFF and its collector *c* will swing from the −15-volt to the +12-volt potential. As the collector *c* of transistor 251 goes through zero potential the signal coupled to gate *g* will cause SCR 263 to turn ON. When SCR 263 conducts, the current flow through resistor 271 provides a voltage drop to bias transistor 273 to turn ON thereby, in turn, causing transistors 277, 281 (which are normally biased OFF) to turn ON. With transistors 273, 277, 281 conducting, a low-impedance circuit path is provided for discharging capacitor 297 rapidly; this circuit is partially traced through lead 275, diode 315 and resistor 313.

Note that when transistor 251 is OFF, transistor 311 is also turned OFF, hence the current through transistors 273, 277, 281 and 289 flows through diode 313 through the base *b* to emitter *e* path of transistor 43 (FIG. 2) to provide a biasing OFF current which causes transistor 43 to turn OFF sharply. Note that transistor 43 will not tend to have a reverse current flowing in a direction from its collector to its emitter, but such current is not significant to the operation of the circuit of FIG. 2.

Resistor 269 is a relatively large resistor and, therefore, the current flow therethrough will be insufficient to keep SCR 263 ON after capacitor 272 has ceased conducting. Note that capacitor 272 tends to maintain SCR 263 conductive for a brief period after transistors 273, 277 and 281 starts conducting.

Double Pulser Circuit

The double pulser circuit 28 functions to provide a signal leveling or signal adjustment such that the current flowing through the welding electrodes at the beginning of each welding operation is of the same amplitude as the current flowing through the welding electrodes at the termination of the preceding welding operation.

In some applications, such as, for example, very high-speed operation, the system of FIG. 1 operates satisfactorily without the double pulser circuit 28. In other applications, the double pulser is desireable to perform the function of maintaining the initial welding current level through the succeeding blanks more constant, as will be explained. Accordingly, as indicated by the manual switching arrangement 30 of FIGS. 1, 5 AND 6, the double pulser circuit 28 may be connected into the system of FIG. 1 or disconnected therefrom and the outputs of the arrestable OS 27 are coupled directly through leads 29, 29B to the current gain circuit 31.

Figure 6:
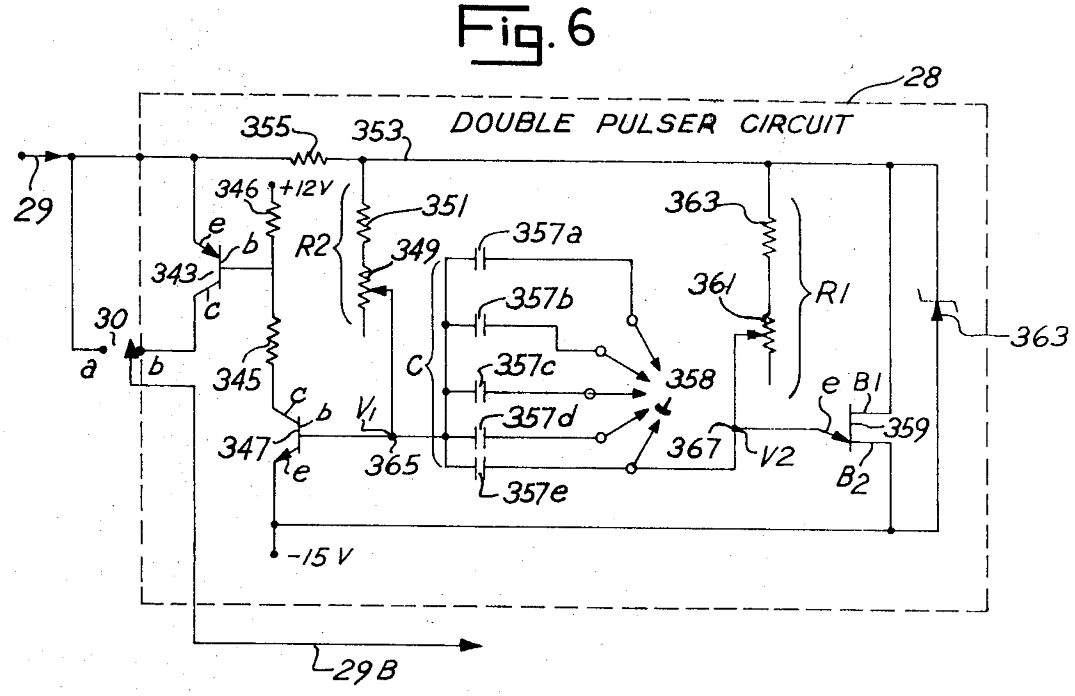
FIG. 6 shows the circuit details of the double pulser circuit 28 which is a portion of the system of FIG. 1.

Referring to FIG. 6, the circuit connections of the double pulser circuit 28 will first be detailed, then the operation of the circuit will be described. The double pulser circuit includes a PNP transistor 343 having its emitter *e* connected to receive an input signal from OS 27. The base *b* of transistor 343 is connected through resistor 345 to the collector *c* of a NPN transistor 347. The collector *c* of transistor 343 is connected through position *b* of switch 30 to provide an output through lead 29B to the current gain circuit 31. As will be appreciated, when the switch 30 is in its position *a*, the double pulser circuit 28 will be bypassed and will not function in the circuit.

Transistor 347 has its emitter *e* connected to the −15-volt bus and its base *b* connected through a rheostat or potentiometer 349, a resistor 351, conductive lead 353, and a resistor 355 to the signal input lead 29. The base *b* of transistor 347 is also connected to the left-hand group (as oriented in FIG. 6) of capacitors generally indicated as 357 which may be selectively connected into the circuit in parallel, as indicated by the switch 358.

The right-hand plate of capacitor 357*e* is connected to the emitter *e* of a unijunction transistor 359, and dependent on the position of switch 358, one or more capacitors 357*a—e* are connected to the emitter *e* of unijunction transistor 359. The unijunction transistor 359 which is of conventional configuration includes a base B1 and a base B2. Emitter *e* of transistor 359 is connected through rheostat 361, resistor 363, lead 353 and resistor 355 to the signal lead 29. For purposes of later explanation, the rheostat 349 and resistor 351 are collectively labeled R2; the rheostat 361 and resistor 363 are collectively labeled R1; and, the capacitors 357*a—e* are collectively labeled C.

The base B1 of unijunction transistor 359 is connected to lead 353, and base B2 is connected to the source of −15-volt potential. A Zener diode 361 has its cathode connected to base B1 and its anode connected to base B2 and breaks down whenever a signal is explanation, at lead 29 thus it regulates the potential at least 353.

Operation of Double Pulser Circuit

Figure 7:
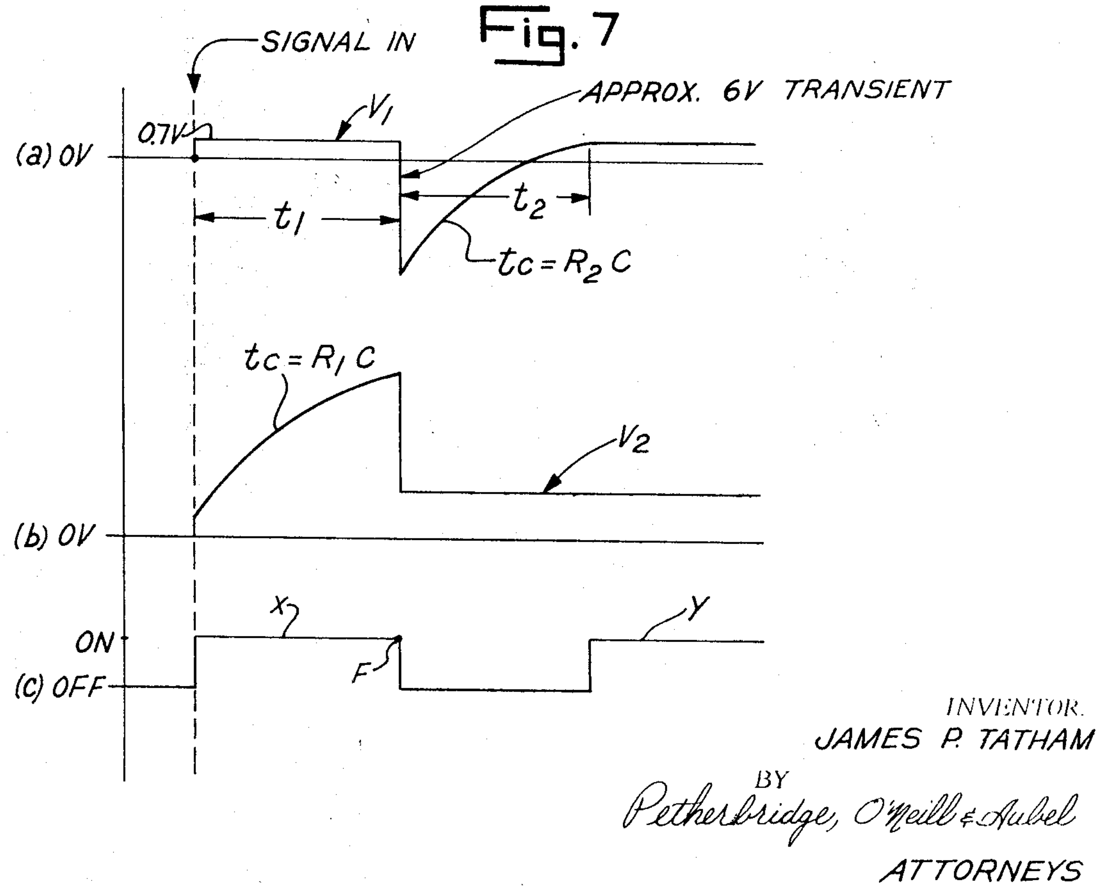
FIG. 7 shows waveforms useful in explaining the operation of the double pulser circuit.

The operation of the double pulser circuit of FIG. 6 will first be described in reference to the waveforms in FIG. 7, then its overall function in relation to the system of FIG. 1 will be explained with reference to the graphs of FIGS. 8 and 9. In this explanation, only capacitor 357*e* will be considered as being coupled in the circuit; however, it will be understood that the explanation applies equally well when one or more of the other capacitors are connected in the circuit.

Assuming switch 30 is in the position shown in FIG. 6, a positive going input from lead 29 appears across the resistor 355 and Zener diode 363 and provides an operating signal to the double pulser circuit. A positive signal will be coupled through the resistors generally labeled R2 to the left-hand side (as oriented in FIG. 6) of capacitor 357*e*. The signal on lead 29 is also coupled through resistor 355, lead 353, the resistors generally labeled R1 to the emitter *e* of unijunction transistor 359.

Note that transistors 343 and 347 are normally off or nonconducting since there normally is no signal at lead 29. A signal on lead 29 causes the voltage at the left-hand plate (as oriented in FIG. 6) of capacitor 357*e* and at terminal point labeled 365 in FIG. 6 increase almost instantaneously from zero to, say the lever $V_1$=0.7 in graph (a) of FIG. 7. The voltage $V_1$ will now bias transistor 347 to conduct. When transistor 347 conducts, it enables transistor 343 to conduct. When transistors 343 conducts, the signal on lead 29 is coupled through transistor 343, switch 30 and lead 29B to the current gain circuit 31.

Concurrently, as the voltage $V_1$ is applied to terminal point 365, a voltage $V_2$ is applied to terminal point 367; that is, the connection to the right-hand plate of capacitor 357*e*. The voltage $V_2$ will start to rise, from an initial low level, at an exponential rate determined by the RC time constant of the resistance R1 and capacitance C, see graph (b) of FIG. 7. When the charge at terminal 367 reaches a predetermined potential, unijunction transistor 359 will fire, as is well known in the art. The voltage at terminal point 367 will then drop sharply as indicated in the waveform of graph (b) of FIG. 7. Since the charge present across capacitor 357*e* (capacitance C) cannot change instantaneously, the potential at terminal point 365 will also drop a corresponding amount, see the waveform of graph (a) in FIG. 7. Accordingly, transistor 347 will be turned OFF and in turn cause transistor 343 to turn OFF, see waveform (c) in FIG. 7. Transistor 347 and hence transistor 343 will remain OFF until terminal point 365 charges exponentially to the 0.7 level, see voltage waveform $V_1$ in FIG. 7, at which time transistor 347 will again be turned ON and again enable transistor 343 to turn ON, see the waveform (c) of FIG. 7.

The RC time constant of the voltage $V_1$ is dependent on the value of the resistors labeled R2 and capacitance C. The output signal from the double pulser circuit 28 on output lead 29B is the double pulse X and Y as shown in the waveform of graph (c) in FIG. 7. Note that the signal input to the double pulser circuit 28 now has to go OFF before the unijunction transistor 359 again changes conducting states; that is, becomes nonconductive, hence the voltage levels $V_2$ and $V_1$ now remain relatively constant, as shown in the waveforms of graphs (a) and (b) of FIG. 7, until the signal on lead 29 is again cut off.

Figure 8:
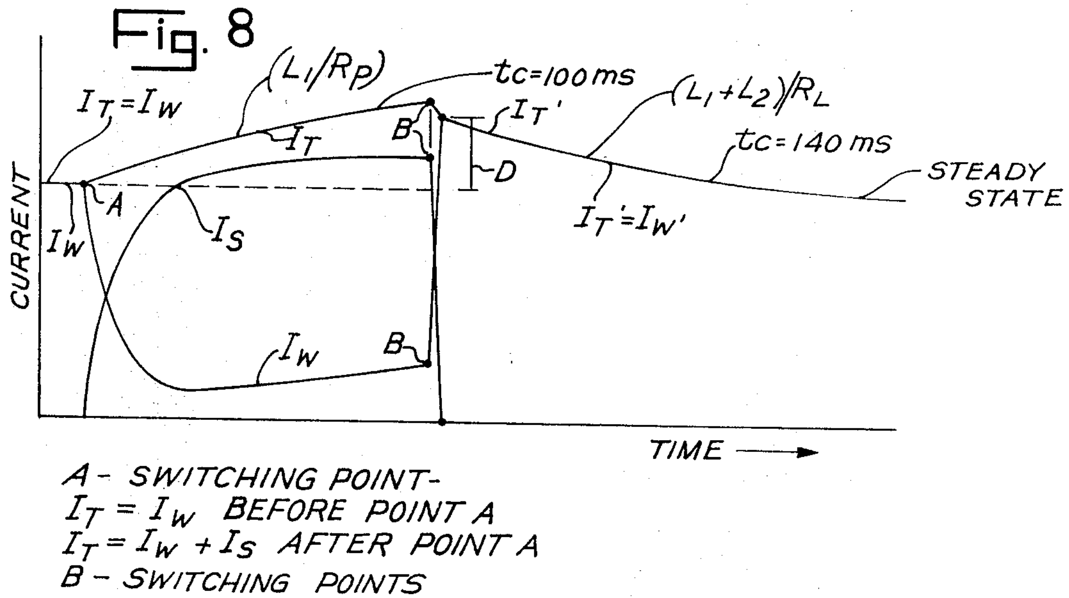
FIG. 8 shows waveforms useful in explaining the operation of the system of FIG. 1 wherein the double pulser circuit is not connected in the system.

Refer now to the waveforms of FIG. 8 which are useful in considering the operation of the double pulser circuit 28 and the current-switching circuit 23. Note that the current $I_W$ flowing through the welding electrodes 21A of FIG. 2 prior to the time the current-switching circuit 23 is energized is equal to the current $I_T$ received from the rectifier 15. At the switching point A, when the switching circuit 23 is energized, the current $I_W$ flowing through the welding electrodes 21A decreases sharply, as indicated in FIG. 8, while the current $I_S$ flowing through the current-switching circuit 23 changes, that is, increases in an inverse ratio.

Figure 9:
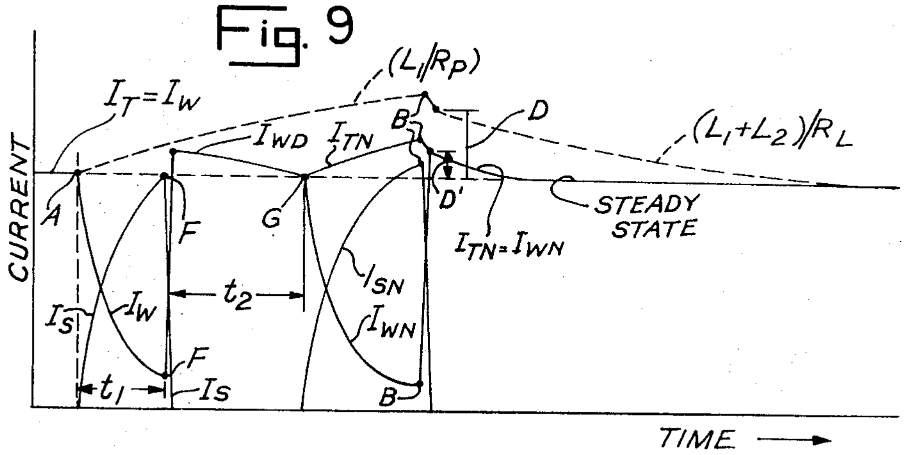
FIG. 9 shows waveforms useful in explaining the operation of the system of FIG. 1 wherein the double pulser circuit is connected in the system.
Figure 10:
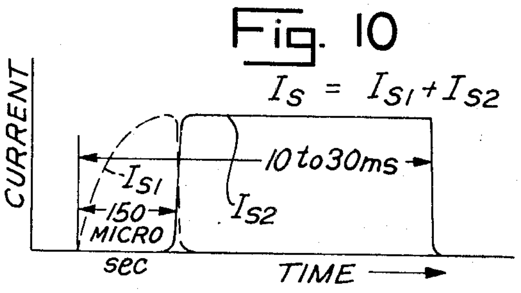
FIG. 10 shows waveforms useful in explaining the waveform $I_S$ shown in FIGS. 8 and 9.

Note that the switching current $I_S$ comprises two principal components, that, is, a component $I_{S1}$ flowing through transistor 41 and a component $I_{S2}$ flowing through transistor 43; that is, $I_{S1}+I_{S1}=I_S$. see FIG. 10. As discussed hereinabove, the transistor 41 conducts for about 150 microseconds, indicated by the dotted waveform in FIG. 10, and the transistor 43 starts to conduct when transistor 41 turns OFF and conducts for 10 to 30 milliseconds (see FIG. 3A). The current $I_S$ indicated in FIG. 9 is thus a composite of $I_{S1}+I_{S2}$.

The total current $I_T$ flowing in the circuit of FIG. 2, after switching point A is given as $I_T=I_W+I_S$ and will increase at a rate determined in part by the relation $L_1/R_P=t.c.$ where $t.c.$ is the time constant; $L_1$ is the inductance of inductor $L_1$, and, $R_P$ is the sum of power supply source resistance plus resistance of the load and the resistance of the transistor of switching circuit 23 taken in parallel; that is, $$R_P=R_{\text{Power Supply}}+\frac{(R_{\text{Load}})(R_{\text{Transistors}})}{R_{\text{Load}}+R_{\text{Transistors}}}$$

Thus, the current $I_T$ increases from its level at point A to a higher level at switching point B, which is the point at which the switching circuit 23 is deenergized or turned OFF. At switching point B, the switching current $I_S$ drops sharply to zero and the welding current $I_W$ increases to equal $I_T$. As is known, there will be some energy consumed during the switching operation as well as some energy transferred from $L_1$ to $L_2$ (see FIG. 2), hence the total current $I_T$, now flowing in the welding electrodes 21*A* will be at a somewhat lower level than the peak value of $I_T$.

As the current $I_T'=I_W'$ flowing through the welding electrodes 21A decreases to a steady state at a relatively slow rate to a steady state level determined in part by the relation $(L_1+L_2)/R_L=t.c.$ wherein $L_1$ is the inductance of the inductor $L_1$; $L_2$ is the inherent inductance of the welding electrode leads and apparatus; and $R_L$ is the resistance of the load, power supply and current busses taken in series; and, $t.c.$ is the time constant. In one embodiment, the time period between switching point B and the point at which $I_W'$ reaches a steady state condition is approximately 140 milliseconds.

Reviewing briefly, starting at switching point A, the welding current will increase from an initial amplitude $I_W$ to a higher level along the line $L_1/R_P=t.c.$ At switching point B, when the switching circuit 23 is deenergized, the entire current $I_T=I_W$ will start to flow through the welding electrodes 21A for the subsequent welding operation. It can be seen that the initial current $I_W'$ available to the welding electrodes 21A at point B will be a differential "D" higher than the final current $I_W$ available to conclude the preceding welding operation. Since it is desirable that the welding operation for succeeding blanks be performed with the same welding current, such that uniform welds are obtained, the differential change "D" in initial current $I_W$ available for the succeeding welding operation is normally undesirable.

The double pulser circuit of FIG. 1 functions to minimize the differential change "D" in current from one welding operation to the next, as will now be explained. Refer to FIGS. 7 and 9, and assume as an example that the transistors 347 and 343 of the double pulser circuit 28 will be turned ON to permit the switching operation to be performed during the period indicated as $t_1$ in both FIGS. 7 and 9. Note that FIG. 9 reproduces, in part, portions of FIG. 8 for purposes of comparison. At the termination of time $t_1$ (see point F in both FIGS. 7 and 9), transistors 343 and 347 are turned OFF, see waveform in graph (c) of FIG. 7. When this occurs, the double pulser circuit 28 provides a signal through lead 29B to turn OFF current gain circuit 31, in turn causing the current switching circuit 23 to turn OFF thereby permitting the current $I_W$ to flow through the welding electrodes 21A. At point F, the switching current $I_S$ goes to zero (see FIG. 9) while the current $I_W$ goes to a peak value. Note that this turning OFF of the switching circuit 23 occurs prior to its normal turn OFF which is at switch point B.

As mentioned above, there is some loss in energy during switching, hence the current $I_{WD}$ now flowing in the welding electrodes 21A is shown as peaking at an amplitude less than $I_T$. The current $I_{WD}$ will flow through the welding electrodes 21A for a time period $t_2$ determined by the time constant of the double pulser circuit 28, as indicated in the waveforms of FIG. 7. At the end of the time period $t_2$ (see point G in FIG. 9), the double pulser circuit 28, transistors 343 and 347 will turn ON, see the waveform of graph (c) in FIG. 7, and thus provide a signal through the current gain circuit 31 to again turn ON the switching circuit 23. A sharply rising current $I_{SX}$ will now flow through circuit 23, and a sharply dropping current $I_{WX}$ will flow through the welding electrodes 21A (see waveforms labeled $I_{SX}$ and $I_{WX}$ in FIG. 9). As noted above, the total current flowing in the circuit of FIG. 2 at this point can be given as $I_{TX}=I_{SX}+I_{WX}$.

When switching circuit 23 is next caused to be deenergized at switching point B, the current $I_{TX}$ is caused to flow through the welding electrodes 21A. Comparing graphically in FIG. 9, it will be seen that the current $I_{TX}$ rises to a peak wherein the differential D' between said peak and the steady state welding current is about one-half of the differential change D effected when the double pulser circuit 28 is not connected in the system of FIG. 1. While for purposes of clarity in the drawings of FIG. 9, differential change D' is shown relatively large, it has been found that the time periods $t_1$, $t_2$ indicated in FIGS. 7 and 9, and the parameters $L_1$, $R_P$ indicated in FIG. 9 can be empirically adjusted such that D' is virtually any value in the range of plus 90 percent of D or minus (opposite to that direction shown) 40 percent of D, and hence the welding current initially applied to each blank is at approximately the steady state level shown in FIG. 9.

As mentioned above in operations wherein cans are moving through the welding electrodes at high rates of speed, the period between switching points A and B in FIGS. 8 and 9 is short and the total rise of waveform $L_1$, $R_P$ is not large. For such operations, the double pulser circuit 28 may not be required. However, in other commercial applications, the period between switching points A and B may be relatively long and, or the rise of waveform $L_1$, $R_P$ may be large, accordingly, for such operations, the double pulser circuit 28 may be desirable to the proper operation of the control circuit and system of FIG. 1.

Referring briefly to FIG. 2, if it is desirable during the switching operation that the current flowing in the welding electrodes 21A be reduced to zero, rather than to a predetermined low level, rectifier means 400, indicated in dotted outline in FIG. 2, may be connected in series with the welding electrodes 21A. The operational characteristics of the circuit of FIG. 2, as described hereinabove, with the rectifier 400 connected as shown will be essentially the same as without the rectifier.

While the invention has been particularly shown and described with reference to preferred embodiments thereof, it will be understood by those skilled in the art that various changes in form and details may be made therein without departing from the spirit and scope of the invention.

I claim:

1. An electrical resistance welding system comprising
cooperating welding electrodes,
means for coupling direct current to flow through said electrodes,
a switching device normally in an electrically open condition operatively connected in a circuit with said electrodes,
capacitor means having at least a pair of capacitive plates, said capacitor having one of its plates connected to be normally charged to a selected potential and also connected to said switching device, the other of said plates being connected to one of said electrodes whereby when said switching device is operated to an electrically closed condition the potential on said first plate increases instantaneously as a step function, and the potential on said second plate increases likewise, and
means for selectively actuating said switching device said direct current flowing to said electrodes and thereby terminating the welding operation.

2. A control system for welding apparatus having a pair of cooperating welding electrodes supplied by a source of direct current for welding metallic blanks comprising a switching circuit connected in parallel to said electrodes and selectively actuable to a first and second operating condition to permit welding current to flow in said electrodes when in said first condition and to shunt welding current from said electrode in the second condition, first photosensitive means positioned at a first point along the path of said blanks moving through said welding electrodes for sensing and detecting the presence and movement of said blanks;

second photosensitive means for sensing and detecting the presence and movement of said blanks, said second photosensitive means being positioned at a second point spaced from said first point along the path of said blanks moving through said welding electrodes;

one-shot circuit means shiftable to a first conducting condition when said first photosensitive means detects a blank at said first point, said one-shot circuit means being shiftable to a second conducting condition when said second photosensitive means detects a blank at said second point to provide signals to respectively actuate said switching means to first and second operating conditions, whereby said switching circuit when in its first operating condition enables the welding current to flow through said welding electrodes and a welding operation to be performed, and when in its second operating condition shunts the welding current from said welding electrodes.

3. A control system as in claim 2 further including rectifier means in series with said welding electrodes whereby the current flowing through said electrodes is selectively reduced to zero.

4. A control system as in claim 2 wherein said one-shot circuit means comprises:

an arrestable one-shot circuit means which remains in said second conducting condition for a selected relatively long time period before normally returning to its first conducting condition, and is arrested or returned to its first conducting condition when said first photosensitive means detects a succeeding blank at said first point.

5. A system as in claim 2 further including:

a pulser circuit connectable electrically to said one-shot means;

said pulser circuit including means for receiving a signal from said one-shot means and converting said signal into a double pulsed output for causing said switching circuit to be energized and deenergized in an ON-OFF-ON sequence whereby the current flowing through the decreased impedance of said switching circuit and said welding electrodes taken in parallel is prevented from increasing above a selected level.

6. A circuit as in claim 5 wherein:

said pulser circuit provides ON-OFF-ON pulses to permit the current to flow through said switching circuit for a selected length of time during the first ON pulse then to switch OFF for a selected length of time before turning ON again such that the current flowing through said switching circuit and said welding electrodes is prevented from rising above a selected level;

whereby the initial current flowing through the welding electrodes on each welding operation is controllable with respect to the level of the current flowing through the welding electrodes at the termination of the preceding welding operation.

7. An electrical resistance welding apparatus for welding individual metallic blanks having overlapped edge portions passing seriatim into contact with a pair of spaced welding electrodes comprising means for coupling a source of direct current to the welding electrodes for effecting welding of metallic blanks passing therebetween, electrical charge storage means coupled to one of the welding electrodes actuable to create a forcing voltage thereby generating a current in opposition to the direct current applied thereto for terminating welding, switching means actuable in response to seriatim passing of metallic blanks coupled to said electrical charge storage means for controlling the charging thereof, and means for shunting the direct current applied to said electrodes subsequent to the generation of the opposing current thereby preventing arcing between electrodes.

8. The apparatus of claim 7 wherein said switching means actuable in response to seriatim passing of metallic blanks includes condition-responsive means positioned in operative contact with metallic blanks passing into contact with said electrodes for generating a control signal to periodically charge said electrical charge storage means in response to the movement of the metallic blanks.

UNITED STATES PATENT OFFICE
CERTIFICATE OF CORRECTION

Patent No. 3,590,209 Dated June 29, 1971

Inventor(s) James P. Tatham

It is certified that error appears in the above-identified patent and that said Letters Patent are hereby corrected as shown below:

Column 3, line 8, cancel "through the welding electrodes" and insert -- therebetween to be welded. Prior to the time the blanks are passed through the welding electrodes, --; line 23, "of" should read -- or --; line 45, "the", second occurrence, should read -- of --. Column 4, line 7, "the same, will be" should read -- the same, as will be --; line 24, "reversely" should read -- reversal --. Column 5, line 2, "lead $L_{17}$" should read -- lead 17 --. Column 6, line 32, "and" should read -- any --; line 72, "collector c transistor" should read -- collector c of transistor --. Column 7, line 21, "rest" should read -- reset --; line 47, "of" should read -- or --. Column 9, line 6, "e transistor" should read -- e of transistor --; line 15, "is feedback" should read -- is a feedback --; line 19, "resistor" should read -- resistors --; line 22, "permits" should read -- permit --; line 29, "second output" should read -- second signal output --; line 37, "positioned" should read -- position --. Column 10, line 16, "portion" should read -- position --; line 23, "of" should read -- on --; line 55, "189 its" should read -- 189 has its --; line 67, cancel "is connected"; line 75, "volt source, source, and" should read -- volt source, and --. Column 11, line 9, "$PN_p$" should read -- PNP --; line 36, "to keep to keep the" should read -- to keep the --; line 45, "210" should read -- 201 --. Column 12, line 20, "(oriented in" should read -- (as oriented in --; line 61, "of" should read -- on --. Column 13, line 3, "diode 313 through" should read -- diode 315 and resistor 313 throuth --; line 30, "AND" should read -- and --; line 71, "explanation" should read -- present --. Column 14, line 6, "circuit" should read -- circuit. --; line 75, "$I_{S1}$ + $I_{S1}$ = $I_S$." should read -- $I_{S1}$ + $I_{S2}$ = $I_S$, --. Column 15, line 3, "I" should read -- $I_S$ --; line 5, "FIG 2" should read

UNITED STATES PATENT OFFICE
CERTIFICATE OF CORRECTION

Patent No. 3,590,209 Dated June 29, 1971

Inventor(s) James P. Tatham PAGE - 2

It is certified that error appears in the above-identified patent and that said Letters Patent are hereby corrected as shown below:

-- FIG 2, --; line 6, "$L_T = I_W + I$" should read -- $L_T = I_W + I_S$ --; line 7, after "relation" insert -- $L_1/R_p$= t.c. where t.c. is --. line 17, "OFF" should read -- OFF. --; lines 27 and 28, "$(L_1 + L_2)/R_L 1/3e.$," should read -- $(L_1 + L_2)/R_L$=t.c., --. Column 16, line 28, "speed" should read -- speed, --. Column 17, line 5, "electrode" should read -- electrodes --. Column 18, line 2, "deenergized" should read -- de-energized --; line 40, "condition-responsive" should read -- condition responsive --.

Signed and sealed this 3rd day of October 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334.